D. S. Wood,
Pump Packing.
Nº 54,636.  Patented May 8, 1866.
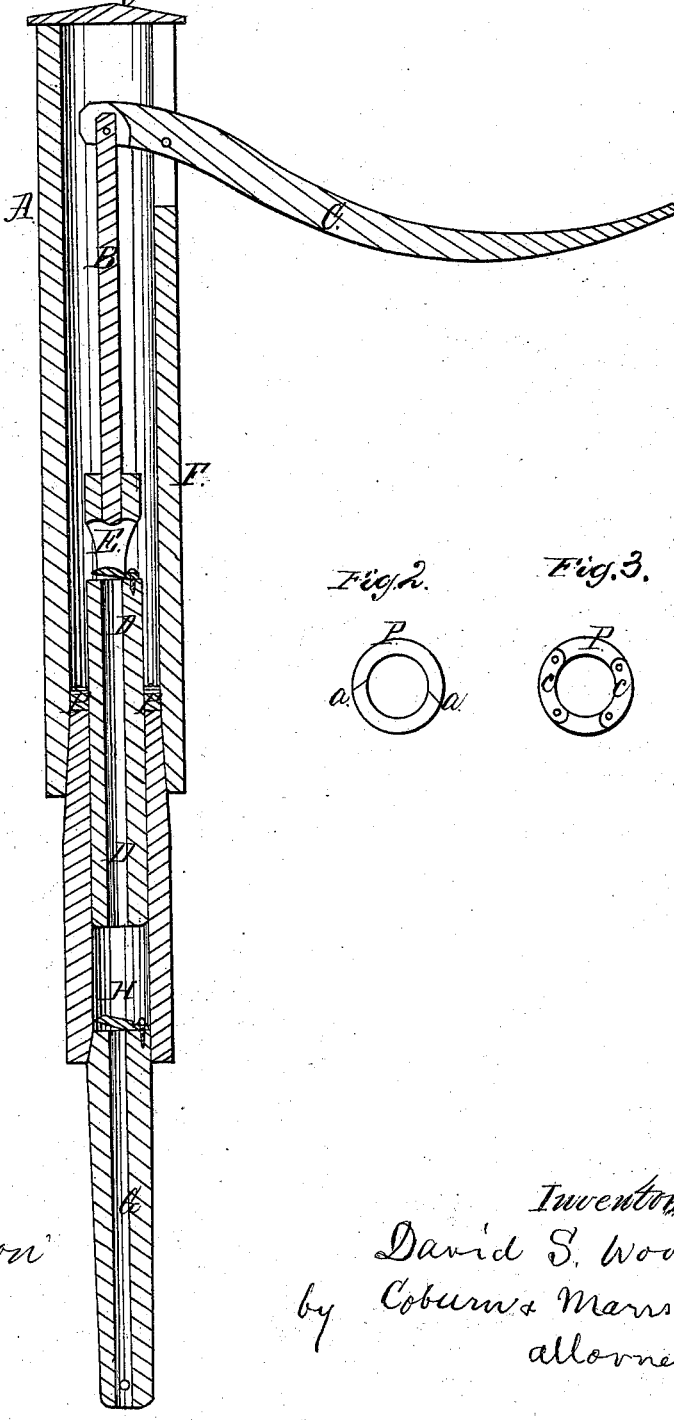

UNITED STATES PATENT OFFICE.

DAVID S. WOOD, OF DELAVAN, WISCONSIN.

IMPROVEMENT IN PUMPS.

Specification forming part of Letters Patent No. 54,636, dated May 8, 1866.

*To all whom it may concern:*

Be it known that I, DAVID S. WOOD, of Delavan, in the county of Walworth and State of Wisconsin, have invented a new and useful Improvement in Pumps; and I do hereby declare that the following is a full, clear, and exact description of the same, reference being had to the accompanying drawings, and the letters and figures marked thereon, which form part of this specification.

The nature of my said invention consists in a novel arrangement of the packing upon the piston for the purpose of rendering the same air-tight in the box or chamber in which it reciprocates, which is hereinafter fully set forth and described.

To enable those skilled in the art to manufacture and make use of my invention, I will proceed to describe the same with particularity, making reference in so doing to the aforesaid drawings, in which—

Figure 1 represents a vertical central section of my invention; Fig. 2, a bottom view of the self-adjusting packing, and Fig 3 a top view of the same.

Similar letters of reference in the several figures denote corresponding parts of my invention.

A represents the ordinary pump-stock; F, the cylinder or chamber in which the piston moves up and down; G, the tubing or pipe leading into the well; H, a valve opening upward; C, the handle whereby the pump is operated; B, the rod connecting the handle with the piston D; E, a valve upon the upper end of the said piston, and P the self-adjusting packing, whose arrangement and construction constitute the principal features of my invention. The said packing is constructed of leather, and rests upon the shoulder formed by the upper end of the chamber F, as shown, and is in the form of a ring, the central opening of which admits the piston D, which is of such length that the stroke thereof cannot withdraw it from said packing. The packing is made of a suitable number of layers of leather to give it the proper thickness, and the edges of the leather resting against the piston, the friction between the packing and piston has very little effect in wearing out the former, which consequently seldom needs repair or renewing.

The operation of my invention is as follows: As the piston D, which is in form a hollow tube, is moved upward, thereby creating a vacuum in the chamber F, the pressure of the atmosphere forces the packing downward, keeping it in its position upon the top of said chamber and forcing it closely around the piston and upon the shoulder on top of said chamber, and effectually packs and renders the piston air-tight, the only frictional resistance to be overcome in operating the piston being that produced by the atmospheric pressure.

The packing P is constructed in two parts, as shown in Fig. 2, *a a* representing oblique edges so arranged that as the friction of the piston wears away the interior of the packing the pressure of the atmosphere will force the parts together, the said edges passing by each other, and thus the packing is made thorough and effectual until it is worn entirely out.

In Fig. 3 are shown two straps which hold the two parts of the packing together, while allowing the same to pass by for the purposes specified.

What I claim as my invention, and desire to secure by Letters Patent, is—

The annular packing P, applied around the piston D upon the upper end of the interior cylinder, substantially as and for the purpose specified.

DAVID S. WOOD.

Witnesses:
W. E. MARRS,
L. L. COBURN.